United States Patent [19]

Ebert

[11] Patent Number: 4,651,894
[45] Date of Patent: Mar. 24, 1987

[54] JACKET SYSTEM FOR AN ENAMELED OR GLASSED VESSEL

[75] Inventor: Klaus-Peter Ebert, Gaiberg, Fed. Rep. of Germany

[73] Assignee: Kennecott Corporation, Cleveland, Ohio

[21] Appl. No.: 785,707

[22] Filed: Oct. 9, 1985

[30] Foreign Application Priority Data

Oct. 13, 1984 [DE] Fed. Rep. of Germany ....... 3437622

[51] Int. Cl.$^4$ .............................................. B65D 90/00
[52] U.S. Cl. ................................... 220/469; 220/465; 220/5 R; 220/5 A; 220/445
[58] Field of Search ............... 220/469, 466, 465, 425, 220/420, 5 R, 3, 5 A, 431, 445

[56] References Cited

U.S. PATENT DOCUMENTS 2,087,349 7/1937 Lucker ................................. 220/5 R
2,301,075 11/1942 Nyberg ............................ 220/465 X
3,062,685 11/1962 Sanford et al. .................. 220/465 X Primary Examiner—Steven M. Pollard
Attorney, Agent, or Firm—R. Lawrence Sahr

[57] ABSTRACT

A jacket for an enameled vessel with a lower outlet nozzle is described comprising an upper weld ring welded along the outer circumference of the vessel, and comprising a lower weld ring surrounding the lower outlet nozzle, and also the jacket as such. The upper weld ring is conically tapering to its lower end, and the lower end of the lower weld ring is shaped cylindrically. Therefore, the upper end of the jacket can be easily welded with the outer side of the lower end of the upper weld ring, since the lower end of the jacket can be moved into a proper position along the cylindrical end of the lower weld ring.

3 Claims, 1 Drawing Figure

JACKET SYSTEM FOR AN ENAMELED OR GLASSED VESSEL

BACKGROUND OF THE INVENTION

1. Field of the Invention

The present invention relates generally to the field of enamelled or glassed metal vessels used in the chemical processing industry and specifically to such vessels which include metal jackets surrounding significant portions of the shells thereof which are enameled or glassed on their interiors.

2. Background

Enamelled or glassed metal vessels are well known and used commonly in the chemical processing industry to contain chemical reactions and/or other chemical processing steps in the manufacture of a wide variety of chemical substances and mixtures. Such vessels are coated on thin interiors with enamel or glass to prevent corrosion, erosion and the effects of elevated and/or decreased temperatures to come into contact with the underlying metal shell of the vessel.

The enamelling or glassing materials, usually in the form of colloidal suspensions, are sprayed onto the interior metal surfaces of the vessel which have been previously prepared to accept those enamelling or glassing materials and to cause them to adhere to those metal surfaces.

Then the vessels are subjected to elevated temperatures, for example, as is provided by a furnace, to "fire" or fuse the enamelling or glassing material to the underlying metal surfaces of the vessel. Such firing, usually to some degree, distorts the shape of the metal shell, but within still acceptable ranges of size and shape in respect to the overall chemical reactor system.

Many such metal vessels are then encased in a metal jacket. The purpose of the jacket, for example, may be to enclose insulation materials around the interior of the vessel shell. Or, for example, the purpose of the jacket may be for structural support of the vessel shell. There is, in any case, usually a more or less uniform gap between the exterior surface of the vessel shell and the interior surface of the metal jacket.

When metal jackets are used on reaction vessels, they must be attached to the exterior of the vessel shell. This is usually done by welding. But the jacket cannot be welded directly to the exterior surface of the metal shell because the localized heat imposed by welding will cause localized distortion, stresses and expansion and contraction of the metal of the vessel shell. Such tends greatly to cause the enamelling or glassing on the interior surface of the vessel shell to crack and, in many cases, fall off.

To avoid such destruction of the enamelled or glassed interior surfaces of the vessel shell, welding rings are attached, usually by welding, to the exterior of the vessel shell before the interior of that vessel shell is enamelled or glassed. The purpose of the welding rings is to provide a metal surface, relatively remote from the metal shell itself, to which the jacket can be welded without imposing the localized heat of welding directly to the area of the exterior of the metal shell adjacent to an enamelled or glassed interior surface of that shell.

Because of the required heating of the shell, to fuse the enamelling or glassing materials to the interior thereof, as mentioned before, distortion of the shell is caused. When welding rings are attached to the exterior surface of the shell prior to firing, the welding rings, likewise, distort when the shell is fired. This distortion of the welding rings causes problems, after the shell is enamelled or glassed, in fitting the jacket to those welding rings in preparation for welding. Because of distortion, gaps are caused erratically and intermittently at the fit of the jacket edges to the welding ring. These gaps necessitate that manual welding be carefully done to lay in a root pass of welding metal which fills those gaps. Once the root pass is in place, ensuring a continuous metal to metal joint of thew jacket to the weld rings, automatic welding techniques, such as submerged arc welding, can be used to lay in the additional weld metal filler to ensure a strong and solid joint. Needless to say that the need for a normal welding root pass requires much additional time and care, using highly trained welders, before the automatic welding methods can be applied.

Thus, there is a need for a means by which the above described gaps can be diminished or reduced to the point that the root welding pass can, also, be applied by automatic welding techniques, thus eliminating the need for an extended time period for manual welding performed by costly trained welders.

SUMMARY OF THE INVENTION

A combination of weld rings are used which are welded to the exterior surface of a chemical reaction vessel shell prior to the application of, and the fusion of, enamelling or glassing materials. The shell is formed of continuous metal comprising a sidewall section, preferably in the form of a hollow cylindrical section, and a bottom section which encloses one end, preferably the lower end, of the sidewall section. A weld ring generally in the form of a converging hollow conical section is welded to the sidewall section and a second weld ring, generally in the form of a hollow cylindrical section is welded to the bottom section, centered in relation to the first weld ring and preferably generally concentric with the central axis of that first weld ring. A jacket, shaped generally in the form of that shell section which lies between the two weld rings, is fabricated with a weld aperture which corresponds with the drametrical sizing of the second weld ring. The jacket has no top section, but is sized, at the edge remote from the weld aperture, to correspond generally to the sizing and shaping of the first weld ring, but is slightly smaller in cross sectional dimension so as to be smaller than the greatest cross sectional dimension of the conical shape of the first weld ring. The jacket is fitted over the vessel shell such that the second weld ring protrudes through the weld aperture of the jacket, and the remote edge of the jacket cones into full contact with the conical surface of the first weld ring. Mechanical pressure can be applied to the jacket both to hold it in place in contact with the weld rings and to slightly distort the remote edge of the jacket to conform to, and be in close metal contact with, the first weld ring. The assembly is then subjected directly to an automatic welding procedure.

DETAILED DESCRIPTION

Figure 1:
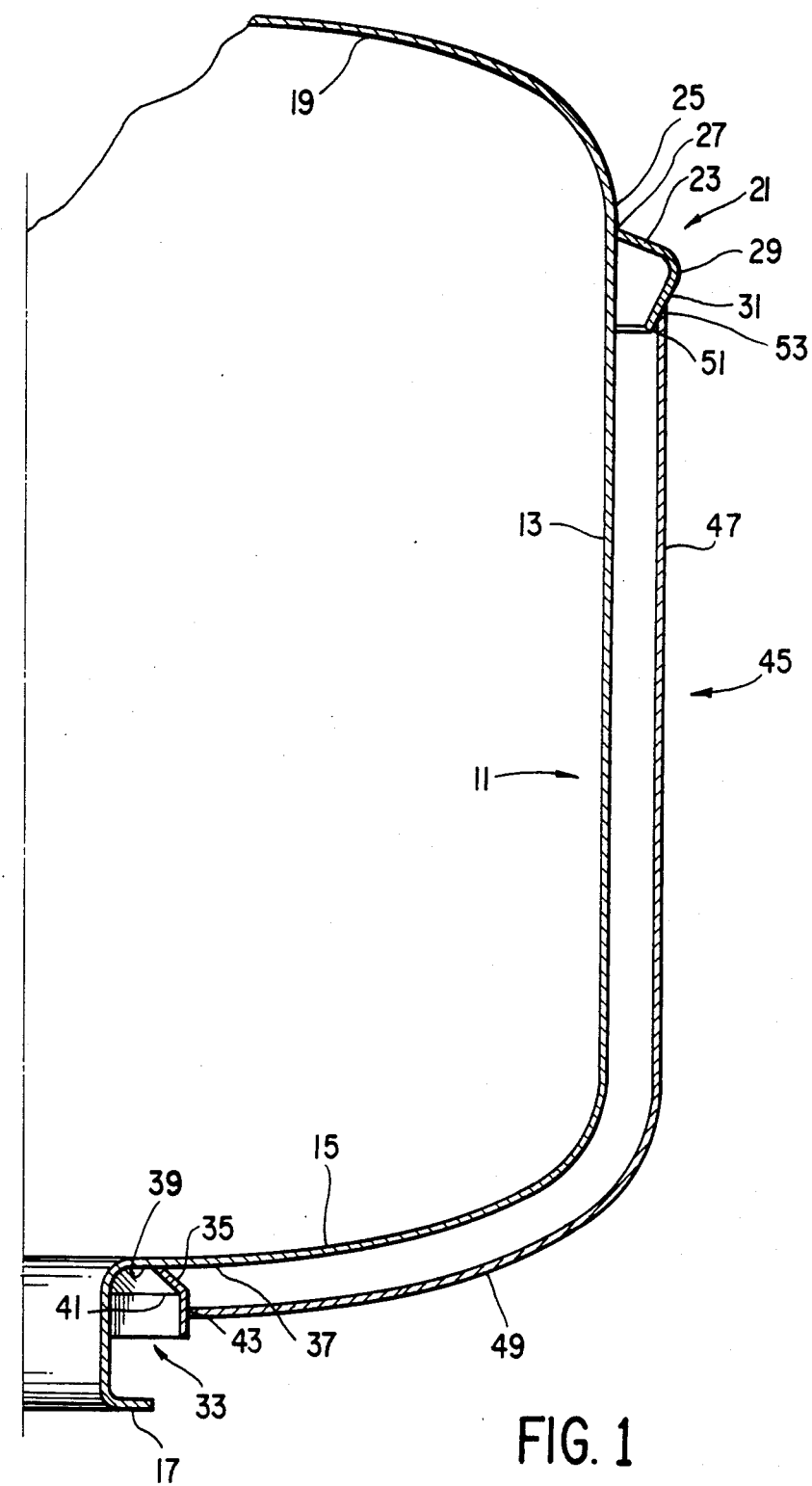
FIG. 1 shows a sectional elevational view of a vertically aligned and jacketed chemical reaction vessel in accordance with the preferred embodiment of the present invention.

Referring to FIG. 1 there is shown a chemical reaction vessel shell 11 which has an enamelled or glass coated interior. Preferrably, the shell 11 is in the form of a vertically aligned generally cylindrical tank with a sidewall 13 in the form of a hollow cylindrical section. Sidewall 13 is enclosed at the bottom by bottom section 15. About the axial center of bottom section 15 is outlet 17 which extends downwardly as shown in FIG. 1. Outlet 17 forms an integrated extension of bottom section 15, and bottom section 15, in turn, forms an integrated enclosure of the bottom portion of sidewall 13 as shown in FIG. 1. All are enamel or glass coated on their interiors.

Outlet 17 is preferably in the form of a cylindrical amulus with its axis of rotation aligned along the central axis of the cylindrical section of sidewall 13. It is possible, of course, to have outlet 17 offset from the central axis of the cylindrical section of sidewall 13. Sidewall 13 is also preferably enclosed, at its upper end, by top section 19 which, likewise, is an integrated enclosure of the upper portion of sidewall 13 as shown in FIG. 1.

Upper weld ring 21 is welded to the exterior of sidewall 13, preferably to the upper portion of sidewall 13 in the general vicinity of top section 19 although preferably below the transition of sidewall 13 into top section 19, about as shown in FIG. 1 as will be well understood by those with skill in the field.

Upper weld ring 21 is formed preferably from sheet metal or metal plate, with a cross sectional thickness which is equivalent to or greater than the cross sectional thickness of sidewall 13. Upper weld ring 21 is comprised of an extension section 23 which extends generally outwardly from the outer circumference 25 of sidewall 13 from weld joint 27. Weld joint 27 is the means of attaching upper weld ring 21 to sidewall 13. Weld joint 27 is made before the interior of reaction vessel shell 11 is enamel or glass coated.

At transition point 29 of upper weld ring 21, which is located at the outermost peripheral circumference of extension section 23, conical section 31 begins and extends to converge inwardly and downwardly back towards sidewall 13 as shown in FIG. 1. Preferably, conical section 31 does not extend inwardly enough to be in contact with outer circumference 25 of sidewall 13, although in some circumstances, it is possible to design conical section 31 to do so.

Lower weld ring 33 is preferably concentrically located to surround outlet 17, preferably being generally larger in diameter than the largest diametrical cross section of outlet 17 as shown in FIG. 1. Lower weld ring 33 is preferably comprised of two sections: Conical section 35 is preferably welded to the exterior 37 of bottom section 15, being attached thereto at weld joint 39 before the interior of reaction vessel shell 11 is enameled or glassed. From weld joint 39, conical section 35 extends downwardly and outwardly, as shown in FIG. 1, diverging away from outlet 17. At transition point 41, the section of lower weld ring 33, namely cylindrical section 43, extends downwardly as shown in FIG. 1. Cylindrical section 43 is hollow and is as large or, preferably, larger in diameter, than the greatest diameter of outlet 17. The downward extension of cylindrical section 43, preferably, corresponds in length to the vertical length of conical section 31 although it is possible to use varying lengths for clearance purposes between cylindrical section 43 and conical section 31.

Metal jacket 45 is shaped to generally correspond to the assembly of sidewall 13 and bottom section 15 of reaction vessel shell 11. Jacket 45 is comprised of jacket sidewall 47 and jacket bottom section 49. Jacket 45 is preferably sized to be larger and to be spaced from both the outer circumference 25 of sidewall 13 and the exterior 37 of bottom section 15 as shown in FIG. 1. Jacket bottom 49 has an annulus formed in it, sized to slip over and mate with cylindrical section 43 as shown in FIG. 1. Jacket sidewall 47 is sized such that its upper egde 51 abuts with conical section 31 as shown in FIG. 1.

In fabrication, Jacket 45 is slipped over reaction vessel shell 11, after reaction vessel shell 11 has been enameled or glassed on its interior. Cylindrical section 43 is fitted through the annulus of jacket bottom section 49 and upper edge 51 is abutted against conical section 31. Mechanical pressure can be applied linearly to jacket bottom section 49 to hold jacket 45 in place and to slightly distort upper edge 51 to conform more closely to the outer surface of conical section 51. Automatic weld joint 53 is then made, preferably by submerged arc welding techniques, although other welding techniques, such as, for example, Metal Inert Gas (MIG) may be used. Finally, weld joint 55 is then made, also by similar automatic welding techniques.

What is claimed is:

1. A jacket system for an enameled or glassed vessel comprising:
   (a) a jacket, formed to surround the bottom and sidewall portions of said vessel, in a spaced apart relationship thereto, said jacket which includes an upper edge and an annulus located in a bottom portion of said jacket;
   (b) a hollow cylindrical section, welded to and extending downwardly from a bottom of said vessel, surrounding an outlet means from said vessel which extends downwardly, said cylindrical section which is welded to said vessel before said vessel is enameled or glassed; and
   (c) a downwardly converging conical member, welded to and extending from a sidewall of said vessel, said conical member which is welded to said vessel before said vessel is enameled or glassed;
   said jacket which is mounted over said vessel after said vessel is enameled or glassed, with said annulus positioned to surround said cylindrical section in sufficiently close relationship to permit the use of solely automatic welding techniques, said annulus and said cylindrical section being welded together, and with said upper edge of said jacket being abutted against said downwardly converging conical member in sufficiently close relationship to permit the use of solely automatic welding techniques, said upper edge and said downwardly converging conical member being welded together.

2. The invention of claim 1 wherein said annulus and said cylindrical section are welded together by at least one solely automatic welding technique.

3. The invention of claim 1 wherein said upper edge and said downwardly converging conical member are welded together by at least one solely automatic welding technique.

* * * * *